(12) United States Patent
Naik

(10) Patent No.: US 9,032,403 B1
(45) Date of Patent: *May 12, 2015

(54) SYSTEMS AND METHODS FOR INSTANT PROVISIONING OF VIRTUAL MACHINE FILES

(71) Applicant: Quest Software, Inc., Aliso Viejo, CA (US)

(72) Inventor: Dilip Chhotubhai Naik, Redmond, WA (US)

(73) Assignee: Dell Software Inc., Aliso Viejo, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/869,188

(22) Filed: Apr. 24, 2013

Related U.S. Application Data

(63) Continuation of application No. 13/101,863, filed on May 5, 2011, now Pat. No. 8,453,145.

(60) Provisional application No. 61/332,137, filed on May 6, 2010.

(51) Int. Cl.
  *G06F 9/455* (2006.01)
  *G06F 7/00* (2006.01)
  *G06F 12/00* (2006.01)
  *G06F 3/06* (2006.01)

(52) U.S. Cl.
  CPC ............ *G06F 9/45537* (2013.01); *G06F 3/065* (2013.01)

(58) Field of Classification Search
  None
  See application file for complete search history.

(56) References Cited

U.S. PATENT DOCUMENTS

| | | | |
|---|---|---|---|
| 4,130,867 A | 12/1978 | Bachman et al. | |
| 4,648,031 A | 3/1987 | Jenner | |
| 4,665,520 A | 5/1987 | Strom et al. | |
| 5,222,235 A | 6/1993 | Hintz et al. | |
| 5,250,687 A | 10/1993 | Lukasavage et al. | |
| 5,297,279 A | 3/1994 | Bannon et al. | |
| 5,325,505 A | 6/1994 | Hoffecker et al. | |
| 5,333,314 A | 7/1994 | Masai et al. | |
| 5,422,979 A | 6/1995 | Eichfeld et al. | |
| 5,423,037 A | 6/1995 | Hvasshovd | |
| 5,455,945 A | 10/1995 | VanderDrift | |
| 5,530,855 A | 6/1996 | Satoh et al. | |
| 5,551,020 A | 8/1996 | Flax et al. | |

(Continued)

OTHER PUBLICATIONS

U.S. Appl. No. 13/101,863, Naik.

(Continued)

*Primary Examiner* — Adam Lee
(74) *Attorney, Agent, or Firm* — Winstead PC

(57) ABSTRACT

Embodiments of systems and methods are described for instant provisioning (e.g., cloning, copying, replicating, migrating, backing up, restoring, etc.) of virtual machines, virtual machine files, or other types of files (e.g., database files). In some implementations, a cloned virtual machine file can present an illusion to multiple applications accessing the cloned file that the cloned file contains all the appropriate data (e.g., a file system volume), even while the clone file is still being filled with relevant data. In some embodiments, the systems and methods use a file system filter driver to intercept and redirect certain input/output (I/O) requests to the cloned file. The file system filter driver may use a data structure (e.g., a bitmap) to determine which logical units of the clone file have already been filled with data. In some embodiments, the systems and methods use the operating system to handle cached I/O requests, which may improve efficiency.

29 Claims, 7 Drawing Sheets

(56) References Cited

U.S. PATENT DOCUMENTS

| | | | |
|---|---|---|---|
| 5,553,303 A | 9/1996 | Hayashi et al. | |
| 5,596,747 A | 1/1997 | Katabami et al. | |
| 5,634,052 A | 5/1997 | Morris | |
| 5,640,561 A | 6/1997 | Satoh et al. | |
| 5,655,081 A | 8/1997 | Bonnell et al. | |
| 5,721,915 A | 2/1998 | Sockut et al. | |
| 5,758,356 A | 5/1998 | Hara et al. | |
| 5,761,667 A | 6/1998 | Koeppen | |
| 5,761,677 A | 6/1998 | Senator et al. | |
| 5,774,717 A | 6/1998 | Porcaro | |
| 5,778,377 A | 7/1998 | Marlin et al. | |
| 5,778,392 A | 7/1998 | Stockman et al. | |
| 5,796,934 A | 8/1998 | Bhanot et al. | |
| 5,799,322 A | 8/1998 | Mosher, Jr. | |
| 5,822,780 A | 10/1998 | Schutzman | |
| 5,848,416 A | 12/1998 | Tikkanen | |
| 5,893,924 A | 4/1999 | Vakkalagadda | |
| 5,933,818 A | 8/1999 | Kasravi et al. | |
| 5,933,820 A | 8/1999 | Beier et al. | |
| 5,940,832 A | 8/1999 | Hamada et al. | |
| 5,943,677 A | 8/1999 | Hicks | |
| 5,948,108 A | 9/1999 | Lu et al. | |
| 5,951,694 A | 9/1999 | Choquier et al. | |
| 5,951,695 A | 9/1999 | Kolovson | |
| 5,956,489 A | 9/1999 | San Andres et al. | |
| 5,956,504 A | 9/1999 | Jagadish et al. | |
| 5,978,594 A | 11/1999 | Bonnell et al. | |
| 5,983,239 A | 11/1999 | Cannon | |
| 5,991,761 A | 11/1999 | Mahoney et al. | |
| 5,995,958 A | 11/1999 | Xu | |
| 6,003,022 A | 12/1999 | Eberhard et al. | |
| 6,016,497 A | 1/2000 | Suver | |
| 6,026,412 A | 2/2000 | Sockut et al. | |
| 6,029,195 A | 2/2000 | Herz | |
| 6,067,545 A | 5/2000 | Wolff | |
| 6,070,170 A | 5/2000 | Friske et al. | |
| 6,119,128 A | 9/2000 | Courter et al. | |
| 6,122,640 A | 9/2000 | Pereira | |
| 6,151,607 A | 11/2000 | Lomet | |
| 6,157,932 A | 12/2000 | Klein et al. | |
| 6,185,699 B1 | 2/2001 | Haderle et al. | |
| 6,243,715 B1 | 6/2001 | Bogantz et al. | |
| 6,253,212 B1 | 6/2001 | Loaiza et al. | |
| 6,289,357 B1 | 9/2001 | Parker | |
| 6,343,296 B1 | 1/2002 | Lakhamraju et al. | |
| 6,363,387 B1 | 3/2002 | Ponnekanti et al. | |
| 6,411,964 B1 | 6/2002 | Iyer et al. | |
| 6,460,048 B1 | 10/2002 | Teng et al. | |
| 6,470,344 B1 | 10/2002 | Kothuri et al. | |
| 6,477,535 B1 | 11/2002 | Mirzadeh | |
| 6,499,039 B1 | 12/2002 | Venkatesh et al. | |
| 6,519,613 B1 | 2/2003 | Friske et al. | |
| 6,523,035 B1 | 2/2003 | Fleming et al. | |
| 6,584,474 B1 | 6/2003 | Pereira | |
| 6,606,626 B1 | 8/2003 | Ponnekanti | |
| 6,631,478 B1 | 10/2003 | Wang et al. | |
| 6,671,721 B1 | 12/2003 | Branson et al. | |
| 6,691,139 B2 | 2/2004 | Ganesh et al. | |
| 6,721,742 B1 | 4/2004 | Uceda-Sosa et al. | |
| 6,728,780 B1 | 4/2004 | Hebert | |
| 6,834,290 B1 | 12/2004 | Pugh et al. | |
| 6,950,834 B2 | 9/2005 | Huras et al. | |
| 7,065,538 B2 | 6/2006 | Aronoff et al. | |
| 7,096,392 B2 | 8/2006 | Sim-Tang | |
| 7,155,558 B1 | 12/2006 | Vaghani et al. | |
| 7,461,103 B2 | 12/2008 | Aronoff et al. | |
| 7,565,661 B2 | 7/2009 | Sim-Tang | |
| 7,757,056 B1* | 7/2010 | Fair | 711/162 |
| 7,784,049 B1* | 8/2010 | Gandler | 718/1 |
| 7,805,423 B1 | 9/2010 | Romine et al. | |
| 7,877,357 B1 | 1/2011 | Wu et al. | |
| 7,904,913 B2 | 3/2011 | Sim-Tang et al. | |
| 7,913,043 B2 | 3/2011 | Helliker et al. | |
| 7,970,748 B2 | 6/2011 | Romine et al. | |
| 7,979,404 B2 | 7/2011 | Sim-Tang | |
| 8,046,550 B2 | 10/2011 | Feathergill | |
| 8,060,476 B1 | 11/2011 | Afonso et al. | |
| 8,117,168 B1* | 2/2012 | Stringham | 707/646 |
| 8,484,164 B1* | 7/2013 | Sivakumar et al. | 707/657 |
| 2005/0234867 A1 | 10/2005 | Shinkai | |
| 2006/0242211 A1* | 10/2006 | Becker et al. | 707/204 |
| 2007/0094312 A1 | 4/2007 | Sim-Tang | |
| 2007/0168641 A1* | 7/2007 | Hummel et al. | 711/206 |
| 2008/0022032 A1* | 1/2008 | Nicholas et al. | 711/100 |
| 2008/0126722 A1 | 5/2008 | Korlepara | |
| 2008/0183944 A1* | 7/2008 | Thornton et al. | 711/6 |
| 2008/0244028 A1* | 10/2008 | Le et al. | 709/208 |
| 2009/0187904 A1* | 7/2009 | Serebrin et al. | 718/1 |
| 2009/0216975 A1 | 8/2009 | Halperin et al. | |
| 2009/0222496 A1 | 9/2009 | Liu et al. | |
| 2010/0011178 A1* | 1/2010 | Feathergill | 711/162 |
| 2010/0037443 A1 | 2/2010 | Wu et al. | |
| 2010/0070725 A1* | 3/2010 | Prahlad et al. | 711/162 |
| 2010/0070978 A1* | 3/2010 | Chawla et al. | 718/105 |
| 2010/0088474 A1* | 4/2010 | Agesen | 711/147 |
| 2010/0100744 A1 | 4/2010 | Dutta | |
| 2010/0146004 A1 | 6/2010 | Sim-Tang | |
| 2010/0162044 A1 | 6/2010 | Sim-Tang et al. | |
| 2010/0186014 A1 | 7/2010 | Vaghani et al. | |
| 2010/0198788 A1 | 8/2010 | Sim-Tang | |
| 2010/0223610 A1 | 9/2010 | Dehaan et al. | |
| 2010/0228903 A1* | 9/2010 | Chandrasekaran et al. | 711/6 |
| 2010/0235831 A1* | 9/2010 | Dittmer | 718/1 |
| 2011/0010515 A1 | 1/2011 | Ranade | |
| 2011/0035358 A1 | 2/2011 | Naik | |
| 2011/0047340 A1 | 2/2011 | Olson et al. | |
| 2011/0061049 A1 | 3/2011 | Kobayashi et al. | |
| 2011/0191834 A1* | 8/2011 | Singh et al. | 726/6 |
| 2011/0197052 A1 | 8/2011 | Green et al. | |
| 2011/0265083 A1* | 10/2011 | Davis | 718/1 |
| 2012/0017114 A1 | 1/2012 | Timashev et al. | |
| 2012/0297246 A1 | 11/2012 | Liu et al. | |

OTHER PUBLICATIONS

U.S. Appl. No. 12/762,162, Mattox.
U.S. Appl. No. 12/902,903, Feathergill.
Microsoft iSCSI Software Target Q and A, published Nov. 30, 2006, http://www.microsoft.com/windowsserversystem/storage/iscsifaq.mspx, in 2 pages.
VMware Technical Note, Infrastructure 3, SAN Conceptual and Design Basics, Jul. 2007, pp. 1-14.
VMware iSCSI SAN Configuration Guide, ESX Server 3.5, ESX Server 3i version 3.5, VirtualCenter2.5, Nov. 2007, in 134 pages.
Veeam Software, "Veeam Takes VMWare Backup to a New Level", Aug. 30, 2010, in 2 pages.
Virtualization.info, "Vizioncore to offer VM backups instantaneous boot—Updated," http, posted online Aug. 12, 2010, in 13 pages.
Quest SharePlex for Oracle, Brochure, Quest Software, Inc., Nov. 1999, 4 pages.
Space Management and Reorganization: Challenges and Solutions, http://quest.com/whitepapers/space_manager wp.doc, published on or around Dec. 21, 1999.
"Top Five Tips for Space Management and Reorganization," believed to be published after Jul. 21, 1998, in 2 pages.
Computer Associates, "Platinum OnlineReorg Technical Overview, OnlineReorg", http://platinum.com/products/custstor/tsreorg.htm, 5 pages downloaded on Nov. 30.
Computer Associates, "Platinum Tsreorg Automates Tablespace Reorganizations, Customer Story", http://platinum.com/products/custstor/tsreorg.htm, 2 pages downloaded on Nov. 30, 1999.
Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.
Computer Associates, "Rapid Reorg for DB2 for OS/390, Brochure", http://platinum.com/products/custstor/tsreorg.htm, 3 pages downloaded on Nov. 30.
Instavia dBeamerTM Data Sheet, 4 pages, last accessed on Apr. 22, 2011.
J. Pagano, paper on Microsoft Exchange Disaster Recovery Planning, document version 3.00, 1996, in 39 pages.

(56) References Cited

OTHER PUBLICATIONS

K. Loney, et al., "Oracle8i, DB Handbook," Oracle Press, 2000, p. 20.

L. Leverenz, et al., "Oracle8i Concepts," Oracle Corp., vol. 2, Release 8.1.5, 1999, p. 20-3.

Oracle: introduction to PL/SQL, Power Point Presentation Regarding Triggers, slides 4, 6-7, 11, 14-17, 28, and 51 http://training.ntsource.com/dpec/COURSES/PL1/plc011.htm, 10 pages downloaded on Oct. 20, 2000.

Using dBeamer to Instantly Clone or Move a Hyper-V Machine, http://www.instavia.com/instant-cloning-or-relocating-of-a-hyper-v-machine?tmpl=compon . . . , 1 page, printed Aug. 11, 2011.

Using dBeamer to Instantly Clone or Move a VMWare Machine, http://www.instavia.com/instant-cloning-or-copying-of-a-vmware-virtual-machine?tmpl=co . . . , 2 pages, printed Aug. 24, 2011.

Veeam Product Overview, Veeam Backup & Replication Virtualization-Powered Data Protection, 2 pages, 2011.

\* cited by examiner

SYSTEMS AND METHODS FOR INSTANT PROVISIONING OF VIRTUAL MACHINE FILES

CROSS-REFERENCE TO RELATED APPLICATIONS

This application is a continuation of U.S. patent application Ser. No. 13/101,863, filed on May 5, 2011. U.S. patent application Ser. No. 13/101,863 claims the benefit of priority under 35 U.S.C. §119(e) of U.S. Provisional Patent Application No. 61/332,137, filed on May 6, 2010. U.S. patent application Ser. No. 13/101,863 and U.S. Provisional Application No. 61/332,137 are hereby incorporated by reference.

BACKGROUND

1. Field

Embodiments of the invention relate to improved operations in a virtual environment and, in particular, to systems and methods for provisioning one or more virtual machines or virtual machine files.

2. Description of Related Art

Many companies take advantage of virtualization solutions to consolidate several specialized physical servers and workstations into fewer servers running virtual machines. Each of these virtual machines can be configured with its own set of virtual hardware, such as a processor, memory, ports, and the like. In particular, a virtualization layer, or hypervisor, allocates the computing resources of one or more host servers to the virtual machines and further provides for isolation between such virtual machines.

In many virtual machine implementations, each virtual machine is associated with at least one virtual machine disk or image located in one or more files in a data store. The virtual machine disk can include files associated with a file system of a guest operating system for the virtual machine. The virtual machine disk can be copied, moved, backed up, or the like, similar to a general data file.

SUMMARY

Embodiments of systems and methods are described for improving or optimizing the creation of instant clones of virtual machines or virtual machine files. A cloned virtual machine file can present an illusion to multiple applications accessing the cloned file that the cloned file contains all the appropriate data, even while the clone is still being filled with relevant data. In some embodiments, the systems and methods use a file system filter driver to intercept and redirect certain input/output (I/O) requests to the cloned file. The file system filter driver may use a data structure (e.g., a bitmap) to determine which logical units of the clone have already been filled with data. In some embodiments, the systems and methods do not handle cached I/O, which may lead to a more efficient system in terms of speed and may provide improved maintainability. In some such embodiments, the operating system may be used to handle cached I/O.

In certain embodiments, a method for cloning a virtual disk file in a virtual computing environment is provided. The method can be performed under control of a computer system comprising one or more physical computing devices. The method comprises receiving a request to clone a source virtual disk file. The source virtual disk file can comprise a source file system representing data stored in the source virtual disk file. The method also comprises instructing a cloning application to begin cloning of a clone virtual disk file from the source virtual disk file. The clone virtual disk file can comprise a clone file system representing data stored or to be stored in the clone virtual disk file. The method also includes launching a virtual machine and associating the clone virtual disk file with the virtual machine before the cloning of the clone virtual disk file is completed. The virtual machine can have access to the entire clone file system of the clone virtual disk file before the cloning of the clone virtual disk file is completed.

The method can also include receiving a read request from an application executing in the virtual machine for data represented in the clone file system of the clone virtual disk file and determining whether the data has been written to the clone virtual disk file. In some implementations, if the data has been written, the method can include retrieving the data from the clone virtual disk file, and if the data has not been written, the method can include retrieving the data from the source virtual disk file. The method can also include receiving a write request from the cloning application to write data to a region in the clone virtual disk file and determining whether the region in the clone virtual disk file has been written. In some implementations, if the region has been written, the method can include communicating to the cloning application that the write has been performed without performing the write request to the clone virtual disk file, and if the region has not been written, the method can include performing the write request to the clone virtual disk file. The method may also include receiving a write request from an application executing on the virtual machine or from a cache manager configured to cache input/output requests to the clone virtual disk file, and performing the write request from the application executing on the virtual machine or from the cache manager to the clone virtual disk file.

In certain embodiments, a system for cloning a virtual disk file in a virtual computing environment is provided. The system can comprise a host server comprising a virtualization layer configured to support a parent partition and a child partition. The parent partition can comprise a virtual machine management system, and the child partition can comprise a virtual machine having a guest operating system and one or more applications that access resources of the host server via the virtualization layer. The system can also comprise a data store comprising at least a source virtual machine disk file and a clone virtual machine disk file. The clone virtual machine disk file can be associated with the virtual machine, and the clone virtual machine disk file can comprise one or more volumes accessible to the guest operating system.

The system can also include a management module executed by or in network communication with the host server. The management module can be configured to instruct a cloning application to begin cloning the source virtual machine disk file to the clone virtual machine disk file. The cloning application may be configured to execute in the parent partition. The management module can also be configured to instantiate a cloning filter in the parent partition. The cloning filter can be configured to act as a file system filter driver in the parent partition and as a volume filter driver in the child partition. The cloning filter can be further configured to, in response to a request from the cloning application to write data to a portion of the clone virtual machine disk file, prevent the cloning application from overwriting the portion of the clone virtual machine disk file if the portion has already been written. The cloning filter can also be configured to, in response to a request from the one or more applications for data in the one or more volumes of the clone virtual disk file, direct the request to the clone virtual disk file if the data has been written to the clone virtual disk file and direct the request to the source virtual disk file if the data has not been written to the clone virtual disk file.

In certain embodiments, a method for copying a source file to a target file in a virtual computing environment is provided. The method can be performed under control of a host computer comprising a virtualization layer supporting a parent partition and a child partition, with the child partition executing a virtual machine having a guest operating system and one or more applications that access resources of the host computer via the virtualization layer. The host computer can be in communication with a data store storing the source file and the target file. The method can comprise executing, in the parent partition, a copying application that copies the source file to the target file, and executing, in the parent partition, a cloning filter configured to intercept write requests by the copying application and read requests by the one or more applications of the virtual machine. The method can also include receiving, during the copying, a read request from the one or more applications for a portion of the target file. In some embodiments, in response to the read request, the method can comprise determining, by the cloning filter, whether the requested portion of the target file has been written. If the portion has been written to the target, the method can include retrieving the requested portion from the target file, and if the portion has not been written to the target file, the method can include retrieving the requested portion from the source file.

The method can also include receiving, during the copying, a write request from the copying application to write to a portion of the target file. In response to the write request, the method can comprise determining, by the cloning filter, whether the portion of the target file has been written. If the portion has been written, the method can include returning to the cloning operation an indication that the write request has been performed without actually performing the write, and if the portion has not been written to the target file, the method can include writing the portion to the target file.

In various embodiments of the methods and systems, a data structure may be associated with a clone virtual disk file, and the data structure can be configured to track whether regions of the clone virtual disk file have been written to. In some embodiments, the data structure is not configured to track identity of an application that performed a write to a region of the clone virtual disk file. In some embodiments, the data structure comprises a bitmap.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
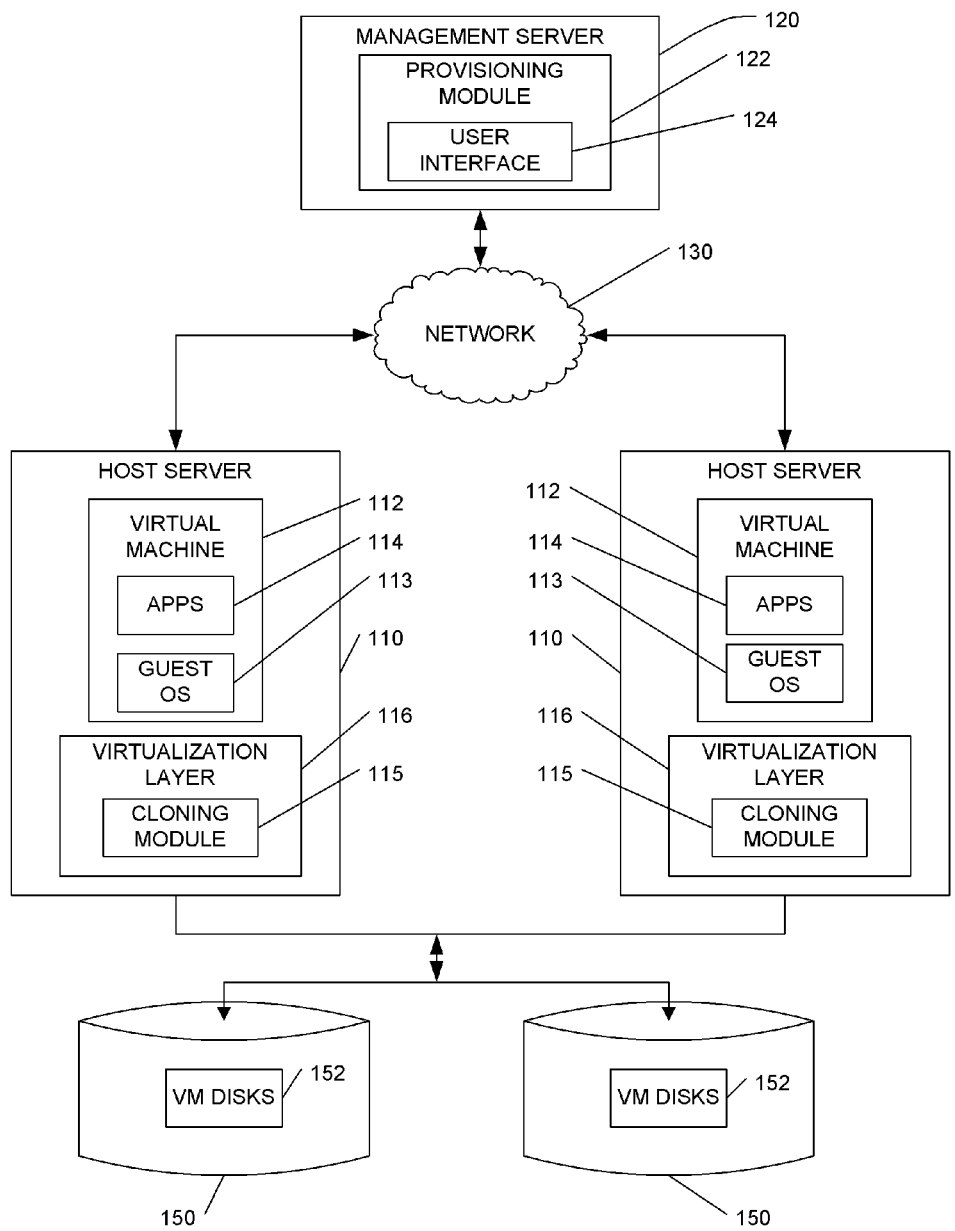
FIG. 1 is a block diagram schematically illustrating an example of a system for instantly provisioning virtual machine files in a virtual computing environment.

Computer systems access an increasing amount of data, whether that data is associated with media such as music, or video, or whether that data is associated with virtual machines. Computer systems traditionally access this vast amount of data using organized units referred to as volumes. A volume can be a logical entity that may include other logical entities, e.g., files and directories. Traditionally, volumes were created on physical media such as hard disks.

Recent developments in virtualization have led to a logical volume being stored inside a file on a physical storage disk. For example, a virtual disk image can be a file on a physical disk, which has a well-defined, published or proprietary, format and can be interpreted by a virtualization system as a hard disk. Examples of such developments include Microsoft® Windows® storing iSCSI (Internet Small Computer System Interface) volumes inside a Virtual Hard Disk (VHD) file, and Windows® 7 storing a volume inside a VHD file and being able to boot from the VHD file. Another example of a logical volume being stored in a file is a volume stored in the VMware® "VMDK" file format.

The VHD file format is associated with Microsoft® Hyper-V and Citrix® Xen virtualization. Both Microsoft and Citrix virtualization products use a VHD file format. Also, some backup applications backup data into VHD volumes. The Microsoft Windows Storage Server product presents block storage devices accessible via the iSCSI protocol and these block storage devices are "backed" by VHD file based volumes.

These volumes backed by files, e.g., VHD, VMDK, or other types of files increasingly contain data that users may desire to both preserve as well to modify. For example, a user may wish to preserve a volume as it exists for archival purposes, yet may also want to start with the volume as it exists and then further modify the data on the volume. An example may be a volume a corporation has declared to be a "golden master image" of software. Another example may be a volume containing a Structured Query Language (SQL) database including business data. A user may wish to run some "what if" scenarios based on the database and study the business outcomes of the scenarios, but the user may not wish to change the data in the original volume. However, SQL transactions typically perform write operations to perform the "what if" scenarios, which would lead to the original volume being modified.

One possible way to achieve the two seemingly contradictory requirements of both preserving the existing volume unmodified as well as modifying the volume is to create a clone of the volume. The original volume is preserved as is, and the clone can be modified. However, traditional cloning methods typically require a significant amount of time for the cloning operation to complete. Further, traditional cloning methods typically do not allow the clone to be accessed until the cloning operation is complete, so that the user must wait for the clone to be finished before accessing the data on the clone (e.g., to perform "what if" scenarios).

Accordingly, certain systems and methods that provide instant provisioning of physical or virtual machines or databases, such that a cloned machine or database can be accessed before the cloning operation is complete, can provide desirable business advantages in many situations. Certain embodiments of the disclosed technology can be used to create clones that are "instant" in the sense that the clone is available for modifications as soon as the cloning operation begins, rather than when the cloning operation completes. The use of the term "instant" in such embodiments generally indicates that applications are provided an illusion that the volume (or machine or database) has been completely cloned (and is accessible to the applications) even if the cloning operation is still in progress and has not completed.

In various embodiments, instant provisioning as described herein may be used for operations including, but not limited to, cloning, copying, moving, replicating, recovering, migrating, backing up, and restoring physical or virtual machines, virtual disk files, logical volumes, files or file systems, databases, and so forth. An illustrative example is an instant restore of a virtual machine from an archived backup, which may provide desirable business continuity when a hard disk crashes (e.g., disaster recovery).

Further, certain embodiments of the systems and methods described herein advantageously can enable instant provisioning of physical machines, virtual machines, and/or databases using software-based solutions executing on existing hardware infrastructure without requiring installation of additional or specialized hardware. Various embodiments can be used with any virtualization system (including full virtualization or paravirtualization) including, e.g., Microsoft® Hyper-V, Citrix® Xen, VMware® ESX, Workstation, Server, or Fusion, Parallels® Virtuozzo or Workstation, and Oracle® VM VirtualBox; with any virtualization file format including, e.g., VHD, VMDK, and Virtual Desktop Image (VDI); with any operating system including, e.g., Microsoft® Windows®, Apple Macintosh OS, Unix, and Linux; with any file system including, e.g., Windows® NTFS, Microsoft® FAT, FAT32, or exFAT, Apple® Hierarchical File System (HFS), and UNIX EXT3, EXT4, RaiserFS, XFS, JFS, or ZFS; and with any database system including, e.g., Oracle® and Microsoft® SQL or Exchange.

II. Example Instant Provisioning Systems

FIG. 1 schematically illustrates a block diagram of an example of a system 100 for instantly provisioning virtual machine files in a virtual computing environment. The instant provisioning system 100 may provide functionality for cloning virtual machine disk files and advantageously may permit a virtual machine to access a cloned virtual machine disk file before the cloning operation is complete. Accordingly, applications executing on a virtual machine can be provided an illusion that an associated virtual machine disk file has been completely cloned (and is accessible to the applications) even if the cloning operation is still in progress and has not completed.

Before describing these instant provisioning features in greater detail, an overview of virtualization and virtual machines will be described so as to give context to the instant provisioning features. The example instant provisioning system 100 shown in FIG. 1 includes one or more host servers 110 that can be implemented with one or more physical computing devices. The host servers 110 can host one or more virtual machines 112 executing on top of a virtualization layer 116. The virtualization layer 116 may include, for example, a hypervisor that decouples the physical hardware of the host server 110 from the operating systems of the virtual machines 112. Such abstraction allows, for example, for multiple virtual machines 112 with different operating systems and applications to run in isolation or substantially in isolation on the same physical machine. The hypervisor can also be referred to as a virtual machine monitor (VMM) in some implementations.

The virtualization layer 116 can include a thin piece of software that runs directly on top of the hardware platform of the host server 110 and that virtualizes resources of the machine (e.g., a native or "bare-metal" hypervisor). In such embodiments, the virtual machines 112 can run, with their respective operating systems, on the virtualization layer 116 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In other embodiments, the host server 110 can include a hosted architecture in which the virtualization layer 116 runs within a host operating system environment. In such embodiments, the virtualization layer 116 can rely on the host operating system for device support and/or physical resource management. Examples of hosted virtualization layers can include, but are not limited to, VMWARE WORKSTATION and VMWARE SERVER by VMware, Inc., VIRTUAL SERVER by Microsoft Corporation, PARALLELS WORKSTATION by Parallels, Inc., Kernel-Based Virtual Machine (KVM) (open source), and the like.

Some or all of the virtual machines 112 can include a guest operating system 113 and associated applications 114. In such embodiments, the virtual machine 112 accesses the resources (e.g., privileged resources) of the host server 110 through the virtualization layer 116. However, in some implementations, the virtual machines 112 can access at least some of the resources of the host server 110 directly. In some implementations, some of the host computers 110 can also include a cloning module 115, which can assist with instant cloning of virtual disk files, as described below.

The host server 110 can communicate with one or more data stores 150 to access virtual machine data. For instance, the data store(s) 150 can include a file system that maintains virtual disk files or virtual machine images 152 for some or all of the virtual machine(s) 112 on the host server(s) 110. The virtual machine disk files 152 can store operating system files, program files, application files, and other data of the virtual machines 112. Example formats of virtual disk files can include VHD, VMDK, VDI, and so forth.

In certain embodiments, the file system 110 is a VMWARE virtual machine file system (VMFS) provided by VMware, Inc. Other platforms may have different file systems (such as, e.g., an NTFS, HFS, FAT, or EXT file system). In other embodiments, the file system and associated virtual machine disk files 152 can be stored on the host server 110 instead of in a separate data store.

The data store(s) 150 can include any physical or logical storage for holding virtual machine files. For instance, the data store(s) 150 can be implemented as local storage for the host server 110, accessible using a serial advanced technology attachment (SATA) protocol, a small computer system interface (SCSI) protocol, or the like. The data store(s) 150 can also be implemented as part of a storage area network (SAN) or network attached storage (NAS). Accordingly, the data store(s) 150 can be accessed over a network using a protocol such as a fibre channel protocol (FCP), an Internet SCSI (iSCSI) protocol, a network file system (NFS) protocol, a common Internet file system (CIFS) protocol, a file transfer protocol (FTP), a secure FTP (SFTP) protocol, combinations of the same, or the like. The data store(s) 150 can also include one or more redundant arrays of independent disks (RAID) or the like.

The instant provisioning system 100 further includes a network 130 for communication between the host server(s) 110 and a management server 120. The network 130 can provide wired or wireless communication between the host server 110, the management server 120, and/or the data store(s) 150. The network 130 can be a local area network (LAN), a wide area network (WAN), the Internet, an intranet, combinations of the same, or the like. In certain embodiments, the network 130 can be configured to support secure shell (SSH) tunneling or other secure protocol connections for the transfer of data between the host server(s) 110 and/or the data store(s) 150.

The management server 120 can be implemented as one or more computing devices. In the embodiment illustrated in FIG. 1, the management server 120 includes a provisioning module 122 that can coordinate instant provisioning operations of the virtual machines 112 through the host servers 110. For example, the provisioning module 122 can cause the cloning module 115 of the host server 110 to perform certain instant provisioning operations such as, e.g., cloning, moving, replicating, recovering, migrating, backing up, and restoring the virtual disk files 152 on the data store(s) 150. The management server 120 may be used to associate virtual disk files (e.g., original or cloned files) with a virtual machine, to power up (or power down) virtual machines, or other virtualization operations.

In some implementations, one (or more) of the host servers 110 can be configured as the management server 120. The management server 120 can include a user interface module 124 for displaying to, and/or receiving from, a user information relating to operation of the management server 120. In certain embodiments, the user interface module 124 causes the display of one or more windows for obtaining user input and/or outputting status information with respect to the virtual environment, the instant provisioning operations, and so forth. For example, the user interface module 124 may display the progress of ongoing cloning operations (e.g., a progress bar), alerts, and so forth. The user interface module 124 may communicate notifications regarding the instant provisioning operations for example, via electronic mail, text message, etc. The provisioning module 122 may provide for tracing, event logging, remote connections for support, etc. The provisioning module 122 may also allow provisioning operations to be paused and resumed (e.g., in the event of a network interruption).

Figure 2:
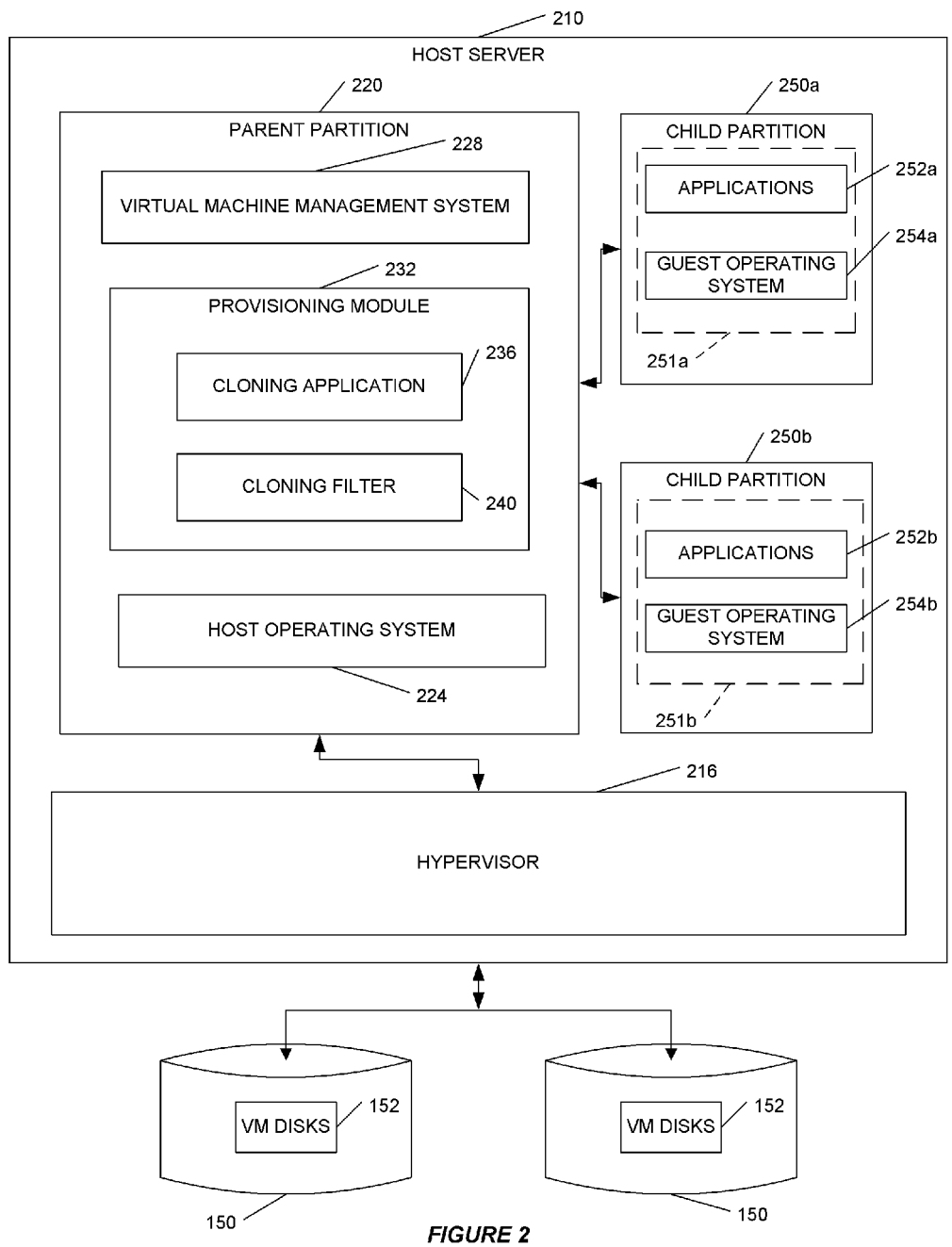
FIG. 2 is a block diagram schematically illustrating an example of a host server providing functionality for instant provisioning of virtual disk files.

FIG. 2 schematically illustrates a block diagram of an example of a host server 210 providing functionality for instant provisioning of virtual disk files. The host server 210 may be generally similar to the host server 110 described with reference to FIG. 1. The host server 210 includes a hypervisor 216 that allows for multiple isolated operating systems to run on the host server 210 at the same time. In the illustrated implementation, the hypervisor 216 is a native or "bare-metal" hypervisor that runs directly on top of the hardware platform of the host server 210. The hypervisor 216 supports multiple partitions 220, 250a, 250b on the host server 210. Partitions are logical units of isolation in which operating systems can execute. The partition 220 is the parent (or root) partition that runs a host operating system 224 (e.g., Microsoft Windows Server). The parent partition 220 can create one or more child partitions 250a, 250b which operate virtual machines 251a, 251b having guest operating systems 254a, 254b and applications 252a, 252b, respectively. In some virtualization implementations, there is one parent partition 220 and there can be no, one, two, or more child partitions 250a, 250b.

A virtual machine management system 228 can run in the parent partition 220 and provide direct access to hardware devices (e.g., data store(s) 150, processors). The virtual machine management system 228 also can be responsible for managing the state of the virtual machines 251a, 251b running in the child partitions 250a, 250b. In the illustrated embodiment, the child partitions 250a, 250b do not have direct access to hardware resources. The child partitions 250a, 250b make requests (e.g., input/output (I/O) requests) to virtual devices, which can be redirected using inter-partition communication (e.g., a virtual bus) to the parent partition 220 (e.g., the virtual machine management system 228 in some embodiments), which directs the request (e.g., via the hypervisor 216) to an appropriate hardware device (e.g., a data store 150).

In the example host server 210 illustrated in FIG. 2, the parent partition 220 includes a provisioning module 232 that implements a cloning application 236 and a cloning filter 240. The cloning application 236 can be used to provide a cloned file of a virtual disk file 152 on a data store 150. As will be further described herein (see, e.g., the description with reference to FIGS. 4-6), the cloning filter 240 can include a file system filter driver configured to implement "instant cloning" functionality that provides an illusion to a virtual machine associated with the cloned file that the virtual disk file has been completely cloned, even before the cloning application 236 has completed the cloning process. For example, among other functionality, the cloning filter 240 may intercept a read request from an application 252a, 252b running in a child partition 250a, 250b and direct the read request to the cloned file, if the requested data has already been written to the cloned file, or to the source file, if the requested data has not yet been written to the cloned file. In some implementations, the cloning filter 240 may also intercept write requests made by the cloning application 236 so that the cloning application 236 does not overwrite data written to the cloned file by applications executing within the virtual machines. Accordingly, a virtual machine (e.g., an application or the guest operating system) will instantly be able to access a cloned disk even before the cloning operation is completed. In some implementations, the cloning filter 240 may be instantiated at the start of a cloning operation and may automatically be terminated, suspended, or removed from intercepting I/O calls when the cloning operation is complete.

In the example shown in FIG. 2, the virtual machines 251a, 251b in the child partitions 250a, 250b may be attached or mounted to one or more virtual disk files 152 in the data store 150. In some implementations, the virtual disk file may include one or more virtual hard disks (VHDs). A virtual disk file such as a VHD can include disk partitions and a file system, which can contain volumes, directories, folders, files, metadata, etc. In some implementations, a VHD attached to a virtual machine running in a child partition is simply a file to the parent partition. Thus, in some such implementations, what appears to be an entire file system volume when seen from within a running child virtual machine (e.g., running in the child partitions 250a, 250b) is actually a large file when seen from the parent virtual machine (e.g., from the parent partition 220).

In some implementations, a single file system filter driver running inside the parent virtual machine (e.g., the parent partition 220) can affect how each child virtual machine (e.g., virtual machines 251a, 251b running in child partitions 250a, 250b) perceives or accesses the contents of a volume attached to the virtual machine. In some such implementations, a single file system filter driver running inside a parent virtual machine advantageously can interact not just with one virtual disk file, but with many virtual disk files that each represent a volume (or volumes) as perceived by multiple virtual machines, which can lead to improved efficiency and improved maintainability. Therefore, in some advantageous implementations, a file system filter driver running in the parent virtual machine can act as a volume filter driver running inside one or more child virtual machines.

In certain embodiments of the example implementations illustrated in FIGS. 1 and 2, the instant provisioning system can be implemented on one host server (e.g., the host server 210) and can handle instant provisioning operations (e.g., cloning) of virtual disk files attached to some or all of the guest virtual machines executing on the host server. Accordingly, a possible advantage of certain such embodiments is that only a single host server may be used for the instant provisioning operations, which may be more efficient than systems requiring the use of multiple host servers. In other implementations, the instant provisioning system can be configured to work with multiple host servers, for example, in a network of host computers.

III. Example Instant Provisioning Features

Figure 3:
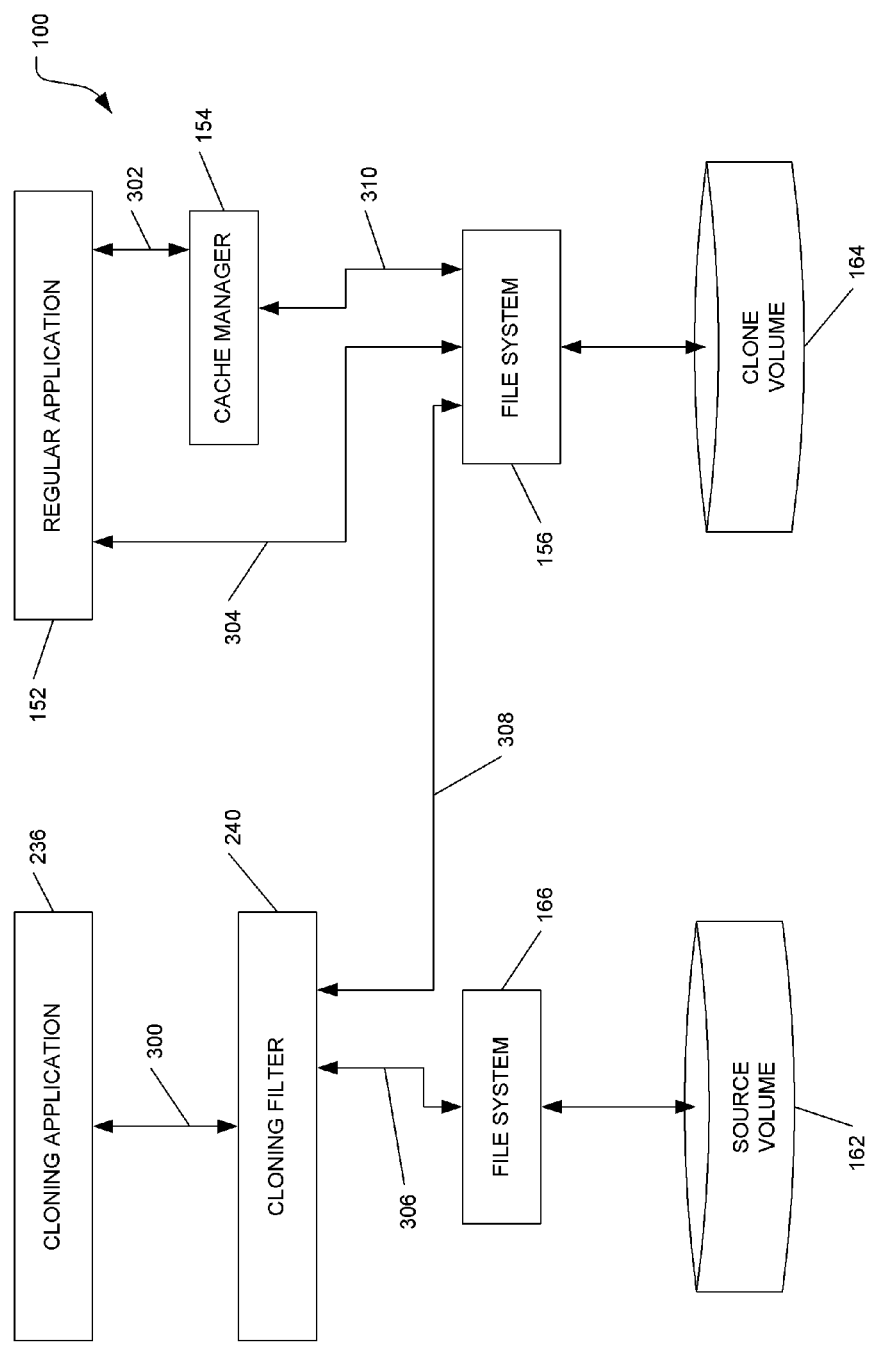
FIG. 3 is a block diagram schematically illustrating interaction of components in an example of an instant provisioning system.

FIG. 3 is a block diagram schematically illustrating interaction of components in an example of an instant provisioning system such as the instant provisioning system 100 described with reference to FIG. 1. In this example, a source volume 162 is being cloned into a target or clone volume 164. The source volume 162 can include a virtual disk file associated a file system 166, and the clone volume can include a virtual disk file associated with a file system 156. The instant provisioning system 100 advantageously allows a virtual machine to access the clone volume 164 (e.g., via the file system 156) before the cloning process is complete.

In some embodiments, the source volume 162 can be treated as a read only volume, and the clone volume 164 can be treated as a read/write volume. The system 100 can improve or optimize the cloning process by reducing or minimizing the amount of programming logic used to create the instant clone, while still allowing applications to perform read/write operations immediately after the cloning process begins.

FIG. 3 uses the term "regular application" 152 to refer to applications that access one or both volumes 162, 164. Regular applications 152 include applications that may have already been created, or will be created for various purposes, and regular applications may not be aware of, or require modification to take advantage of, the instant provisioning functionality. Regular applications 152 may execute in a child virtual machine (e.g., one of the virtual machines 251a, 251b illustrated in FIG. 2). Examples of regular applications 152 include programs such as Microsoft Office, a database program, a spreadsheet program, an e-mail program, a backup application, or virtualization programs.

Although FIG. 3 illustrates only a single regular application 152 for purposes of illustration, the system 100 can accommodate any number of regular applications executing simultaneously and/or any number of virtual machines. FIG. 3 also illustrates a cache manager 154, which is a standard element of many operating systems. The cache manager 154 may implement virtual or logical block caching to cache in memory data that is requested by regular applications 152 or the file system 156. Caching may improve I/O performance of the operating system. The cache manager 154 and the file systems 156, 166 are illustrated in this example to explain how the system 100 may interact with commonly-used operating system components and are not intended to limit the scope of the systems and methods disclosed herein.

The example instant provisioning system 100 illustrated in FIG. 3 also includes a cloning application 236 and a cloning filter 240. The cloning filter 240 may be implemented using a file system filter driver. As discussed, in some advantageous implementations, a file system filter driver running in a parent virtual machine can act as a volume filter driver running inside one or more child virtual machines.

With reference to the example system shown in FIG. 2, the example host server 210 may implement the cloning application 236 and the cloning filter 240 as components of the provisioning module 232. The cloning application 236 and the cloning filter 240 may be executed by the parent partition 220. One or more regular applications 152 may be executed as applications 252a, 252b of the virtual machines 251a, 251b executing in the child partitions 250a, 250b, respectively. The cache manager 154 may be implemented by the guest operating systems 254a, 254b, the host operating system 224, and/or the hypervisor 216. The source volume 162 and/or the clone volume 164 may reside on the same or different data store(s) 150. The source volume 162 and/or the clone volume 164 may include one or more files (e.g., virtual disk files). For example, a source volume 162 may be written to a plurality of clone volumes 164.

The cloning application 236 can read the contents of the source volume 162 and write the contents into the clone volume 164. While the cloning application 236 is performing this copying, a regular application 152 can access the clone volume 164 and perform read/write operations. As will be described with reference to FIGS. 4-6, when the regular application 152 attempts to read from a part of the clone volume 164 that has already been written to (either by the cloning application 236 or a regular application 152), data is retrieved from the clone volume 164 and returned to the regular application 152. When the regular application 152 attempts to read from a part of the clone volume 164 that has not yet been written to, the cloning filter 240 can be used so that the requested data is retrieved from the source volume 162 and returned to the regular application 152. The cloning filter 240 may also be used to ensure that data written to the clone volume 164 by a regular application 152 is not overwritten by the cloning application 236.

Thus, use of the cloning filter 240 can cause an illusion for the benefit of regular application(s) 152 that the clone volume 164 is fully populated with data. The cloning filter 240 can also mediate read/write requests between a regular application 152 and the cloning application 236. The cloning filter 240 can distinguish between write operations coming from a regular application 152 and write operations coming from the cloning application 236. Data in the clone volume 164 already written to by any regular application 152 is never overwritten by the cloning application 236.

Accordingly, the cloning filter 240 advantageously allows multiple write operations to proceed on the clone volume 164, e.g., writes by the cloning application 236 and writes by one or more regular applications 152. Embodiments of the system 100 can provide a hierarchy of write operations such that regular applications 152 may overwrite previous writes made by the cloning application 236 (or by regular applications 152) but the cloning application 236 is not permitted to overwrite data written to the clone volume 164. Therefore, the data on the source volume 162 is preserved while data on the clone volume can be modified (by regular applications 152).

FIG. 3 schematically illustrates non-limiting examples of input/output paths among components of the example system 100. An I/O path 300 can exist between the cloning application 236 and the cloning filter 240. The cloning application 236 can perform non-cached write operations using this I/O path 300. In some implementations, the cloning application 236 does not use write operations or application program interfaces ("APIs") provided by the operating system (e.g., host operating system 224). If the cloning application 236 were to use host operating system write APIs, the cloning filter 240 would need to determine the identity of the application causing a write operation for every write operation (e.g., whether the writer is the cloning application 236 or a regular application 152), which may lead to programming complexities and run-time inefficiencies. Therefore, certain embodiments of the system 100 instead use a private interface (e.g., a private API) that the cloning filter 240 implements for the benefit of the cloning application 236. In some such implementations, the use of the private API implicitly informs the cloning filter 240 as to the identity of the application performing a write operation, which may lead to programming simplicity and run-time efficiency.

In some implementations of the system, for cached I/O operations, an I/O path 302 can exist between a regular application 152 and the operating system cache manager 154. In this example, there is no interaction with the cloning filter 240 when the regular application 152 is performing cached reads or cached writes, which can lead to a simpler system with higher efficiency and improved maintainability. Accordingly, in some such implementations, the example system 100 simply uses the guest operating system to handle cached I/O.

For non-cached write operations by a regular application 152, an I/O path 304 can exist between the regular application and the clone volume 164. In this example, there advantageously may be no interaction with the cloning filter 240, because write operations by a regular application have precedence over write applications by the cloning application 236. Accordingly, the cloning filter 240 does not need to determine whether the cloning application 236 has already written the data to the clone volume 164.

I/O path 306 illustrates an example of the cloning filter 240 performing a read operation on the source volume 162. I/O path 308 illustrates an example of the cloning filter 240 performing a non-cached read or write operation on the clone volume 164. I/O path 310 illustrates an example read or write operation on the clone volume 164 by the operating system cache manager 154.

In an example implementation, when an instant clone is requested, the management module 120 supplies the identity of the source volume 162 and the clone volume 164. The system 100 can determine the size of the source volume 162 and can initialize a data structure internal to the cloning filter 240 that tracks whether data has been written to the clone volume 164. In some implementations, the data structure comprises a bitmap called a SectorBitMap. Other data structures could be used such as, e.g., an array. In some implementations, each unit in the SectorBitMap tracks a logical unit of the clone volume 164 (e.g., block, track, sector, cluster, etc.). For example, a unit in the SectorBitMap could track or represent 512 bytes, 2048 bytes, 4 kB, or some other unit in the clone volume 512. A unit or "bit" in the SectorBitMap may correspond to any amount of space used to store information related to the representation of the clone volume. For example, a "bit" could be represented by 1 bit, 1 byte, 4 bytes, 8 bytes, or any other value. These example values of units in the SectorBitMap and logical units tracked on the clone volume are illustrative and may be different in various implementations. Also, although examples of the data structure are called SectorBitMaps, this terminology is for convenience of presentation only, and in other embodiments, the data structure is not required to be a bitmap nor is the data structure required to track only sectors on the clone volume 164.

Embodiments of the system 100 can use the SectorBitMap to track whether or not the corresponding logical unit of the clone volume 164 has been written to. A bit in the SectorBitMap can be set when either the cloning application 236 or a regular application 152 writes to the corresponding logical unit of the clone volume 164. In some embodiments, the system 100 can create a SectorBitMap for each clone volume when a cloning operation is begun and, once the cloning operation is complete, the system can discard the SectorBitMap. In some embodiments, the SectorBitMap is stored in memory (e.g., RAM). The SectorBitMap may also be committed to persistent memory (e.g., non-volatile storage such as a hard drive) so that in the event of an interruption or a pause, the SectorBitMap can be read from the persistent memory, and the cloning process can be restarted from where it was interrupted or paused. Accordingly, in certain embodiments, the instant cloning operation can be paused and resumed. For example, a user may pause and/or resume the instant cloning operation using the user interface module 124.

IV. Example Instant Provisioning Procedures

Figure 4:
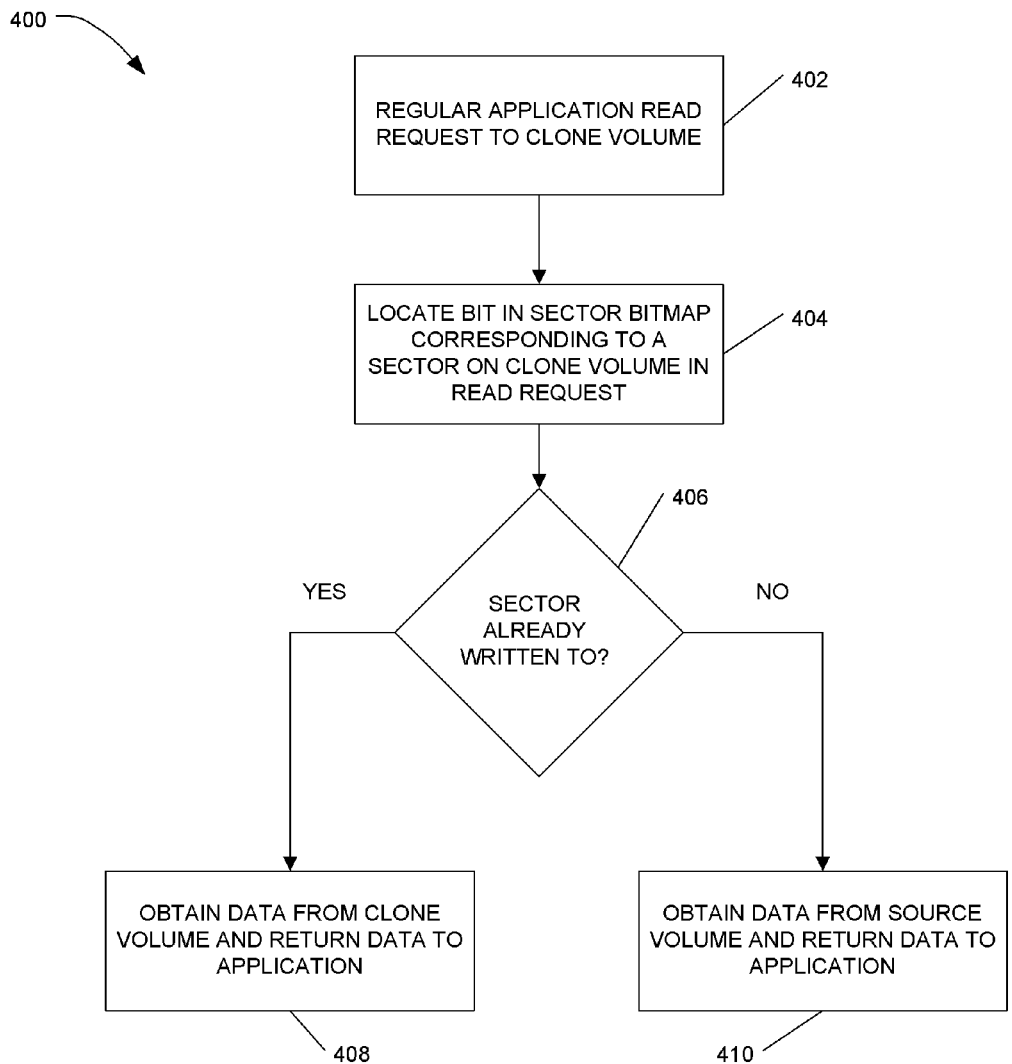
FIG. 4 is a flowchart schematically illustrating an example method for handling read requests from applications.
Figure 5:
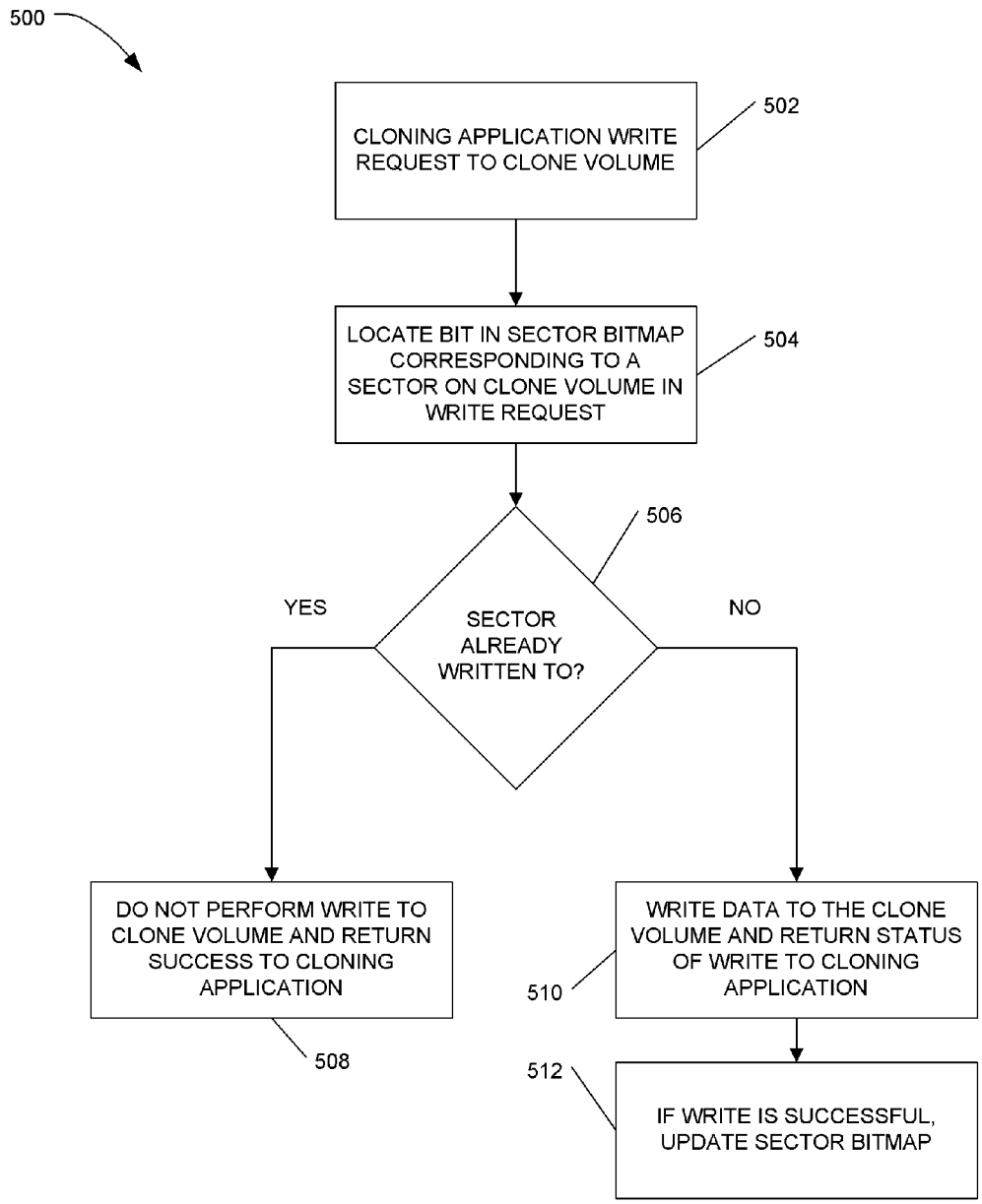
FIG. 5 is a flowchart schematically illustrating an example method for handling write requests from a cloning application.
Figure 6:
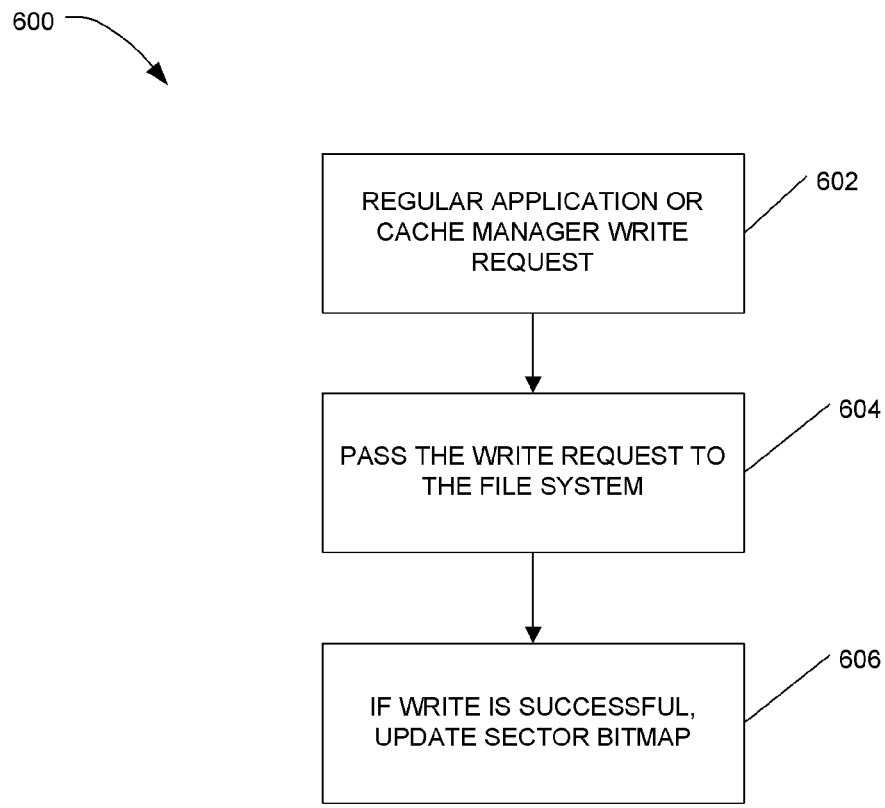
FIG. 6 is a flowchart schematically illustrating an example method for handling write requests from a regular application.

FIGS. 4-6 schematically illustrate non-limiting examples of I/O methods that can be implemented by embodiments of the instant provisioning systems described herein.

FIG. 4 is a flowchart schematically illustrating an example method 400 for handling read requests from regular applications. Embodiments of the instant provisioning system 100 may implement the example method 400.

At block 402, a regular application issues a read request for data from the clone volume 164. The data may, but need not, already have been written to the clone volume 164. At block 404, the cloning filter 240 receives the read request determines whether the requested region of the clone volume 164 has been written with data. For example, the cloning filter 240 can consult the SectorBitMap to locate the bit(s) corresponding to the sector(s) of the clone volume 164 that the regular application is attempting to read. As discussed, the bits in the SectorBitMap can be configured to track any amount of logical unit space on the clone source 164. In the illustrative examples presented in FIGS. 4-6, the logical unit on the clone volume 164 includes one or more sectors, but this is for purposes of illustration and is not intended to be a limitation.

At block 406, the method 400 determines based at least in part on the SectorBitMap whether the sectors of the clone volume 164 that the regular application is attempting to read have been written to. Writes may have been performed by the cloning application 236, by the regular application issuing the read request, or by another regular application.

Block 408 represents the case where the sector being read by the regular application has already been written to. The write to this sector may have been performed by the cloning application 236 or a regular application 152. In block 408, where the relevant sector in the clone volume 164 has already been written, the cloning filter 240 allows the read operation to continue unchanged to the file system. The file system 156 will retrieve the relevant data from the clone volume 164 and return the data to the regular application. An example of this operation is illustrated as I/O path 308 in FIG. 3.

Block 410 represents the case where the sector being read from the clone volume has not yet been written. In this case, the cloning filter 240 retrieves the relevant data from the source volume 162 (e.g. via the file system 156). An example of this operation is also illustrated as I/O path 306 in FIG. 3.

Accordingly, the example method 400 permits a regular application to have the illusion of reading data from a complete clone volume 164, whether or not the data has yet been written to the clone volume 164.

FIG. 5 is a flowchart schematically illustrating an example method 500 for handling write requests to the clone volume 164 from the cloning application 236. At block 502, the cloning application 236 issues a write request to write data to one or more sectors of the clone volume 164. At block 504, the cloning filter 240 receives the write request from the cloning application 236 and proceeds to locate the corresponding bit(s) in the SectorBitMap that represents the one or more sectors of the clone volume 164 the cloning application 236 is attempting to write to.

At block 506, the method 500 determines based at least in part on the corresponding bit(s) in the SectorBitMap whether or not the sector of the clone volume 164 has already been written (e.g., by a regular application).

Block 508 represents the case where the method 500 determines the relevant sector(s) on the clone volume 164 have already been written to. In this case, in some embodiments, the method 500 does not actually perform the write issued by the cloning application 236. Accordingly, the method 500 will not overwrite a region of the clone volume 164 that has already been written to, which advantageously gives higher priority to writes to the clone volume 164 previously made by regular applications. In some embodiments, the cloning filter 240 informs the cloning application 236 that its write succeeded.

Block 510 represents the case where the method 500 determines the relevant sector in the clone volume 164 has not yet been written. In this case, the method 500 performs a write operation to the clone volume 164. For example, the cloning filter 240 may request the file system 156 perform an uncached write of the data to the clone volume 164. An example of this operation is illustrated as I/O path 308 in FIG. 3. If the write to the clone volume 164 is successful, the method 500 may return a successful status to the cloning application 236 and in block 512 may update the corresponding bit(s) in the SectorBitMap to indicate that the relevant sector(s) of the clone volume 164 have been written to.

FIG. 6 is a flowchart schematically illustrating an example method 600 for handling write requests 602 from a regular application 152 or the cache manager 154. In this example, at block 604, the method 600 simply passes the write request to the file system 156 for writing to the clone volume 164. In some implementations, the cloning filter 240 passes the write request to the file system 156, without further interaction by the cloning filter 240. An example of a write operation from the cache manager 154 is illustrated as I/O path 310 in FIG. 3, and an example of an uncached write operation from a regular application 152 is illustrated as I/O path 304 in FIG. 3. If the write to the clone volume 164 is successful, in block 606, the method 600 may update the appropriate bit(s) in the SectorBitMap to indicate that the relevant sector(s) have been written to (e.g., the cloning filter 240 may update the SectorBitMap).

In the example methods 500, 600, the cloning filter 240 may, in some implementations, consult the SectorBitMap simply to determine whether corresponding sector(s) of the clone volume 164 have been written, but the cloning filter 240 need not determine the identity of the writer that performed the write operation, which advantageously may improve the efficiency of these example methods. Also, for these example methods, in performing write requests by regular applications 152 or the cache manager 154, the cloning filter 240 does not need to consult the SectorBitMap prior to the write being performed (e.g., it may simply pass the write request to the file system 156), which also advantageously may improve efficiency. After the write is successfully completed, the cloning filter 240 may update the SectorBitMap to reflect the successful write.

As discussed, when the cloning operation is complete, the cloning filter 240 may terminate (or otherwise remove itself from I/O requests by regular applications). In some implementations, the SectorBitMap can be automatically deleted when the cloning operation is complete. In other implementations, the SectorBitMap may be committed to persistent memory, archived, or otherwise stored.

Figure 7:
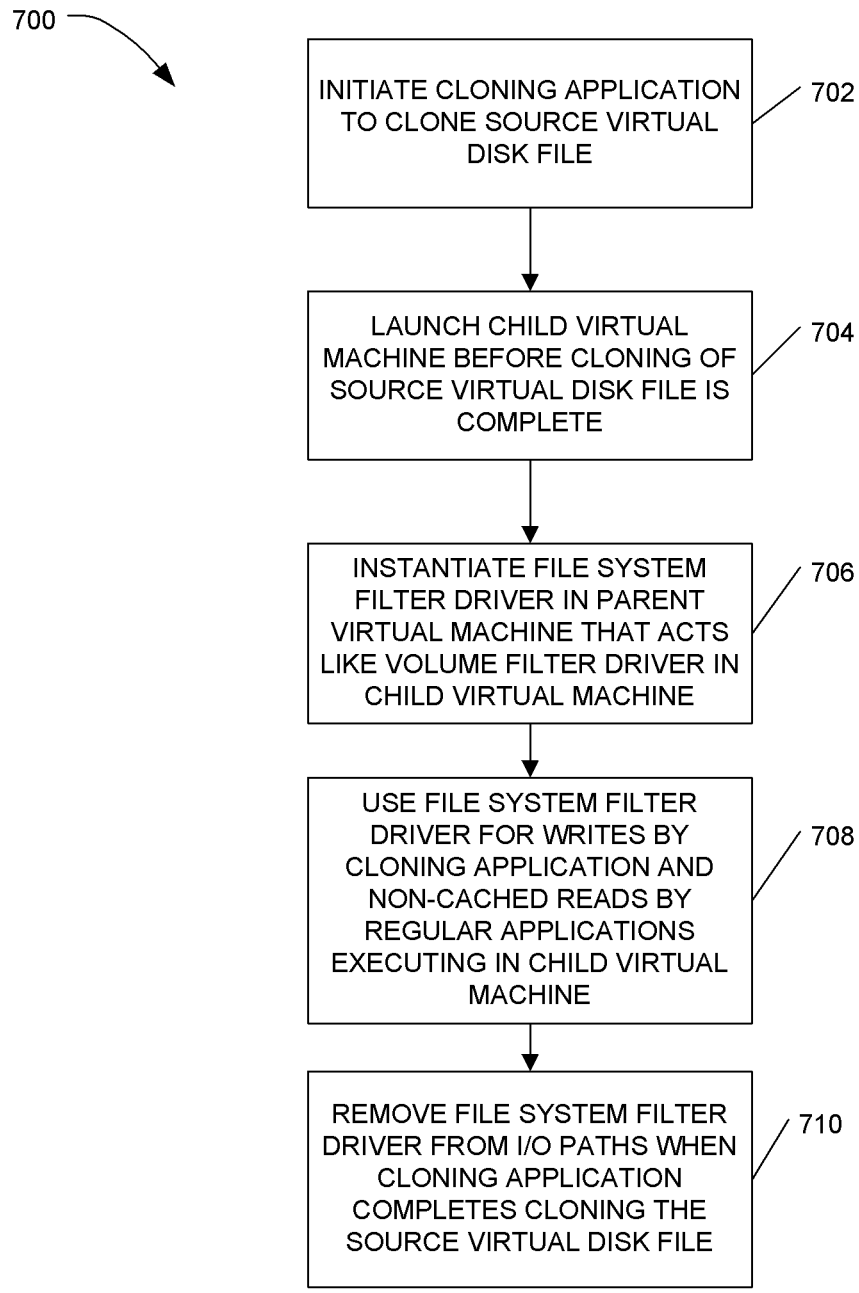
FIG. 7 is a flowchart schematically illustrating an example method for instant provisioning using a file system filter driver.

FIG. 7 is a flowchart schematically illustrating an example method 700 for instant provisioning using a file system filter driver. At block 702, a cloning application can be initiated to clone a virtual disk file (e.g., the source volume 162) to a target or clone virtual disk file (e.g., the clone volume 164). The cloning application can be executed in a parent virtual machine (e.g., the parent partition 220) executing on a host computer (e.g., the host server 210). At block 704, a child virtual machine can be launched before the cloning application completes cloning the source virtual disk file. The child virtual machine may be executed in a child partition (e.g., one of the child partitions 250a, 250b) executing on the host computer or another computer in network communication with the host computer executing the cloning application. The clone virtual disk file can be attached or mounted to the child virtual machine. At block 706, a file system filter driver (e.g., the cloning filter 240) can be instantiated in the parent virtual machine. As discussed, in some implementations, the file system filter driver executing in the parent virtual machine acts like a volume filter driver to applications executing in the child virtual machine.

At block 708, the file system filter driver can be used to intercept certain I/O operations issued by the cloning application and/or by regular applications executing in the child virtual machine. The intercepted I/O operations can be handled differently (or with additional functionality) by the file system filter driver than would occur for normal I/O operations by the virtual machine's operating system. For example, in some implementations, the file system filter driver can intercept writes by the cloning application to prevent overwriting regions of the clone virtual disk file that have already been written to (see, e.g., FIG. 5). In some implementations, the file system filter driver can intercept non-cached reads issued by regular applications executing in the child virtual machine and instruct that the requested data be retrieved from either the clone volume or the source volume, as appropriate (see, e.g., FIG. 4). In some implementations, the file system filter driver may not intercept writes or cached reads by regular applications executing in the child virtual machine (see, e.g., FIG. 6), which may improve efficiency. In other implementations, the file system filter driver may intercept cached reads and/or writes by the regular applications executing in the child virtual machine. In some implementations, the file system filter driver uses a data structure (e.g., the SectorBitMap) to track whether regions of the clone virtual disk file have been written to. In some such implementations, the data structure includes information on whether regions of the clone virtual disk file have been written to, but the data structure may not include information on the identity of the writer, which may improve efficiency.

At block 710, when cloning of the clone virtual disk file is complete, the file system filter driver may terminate (or otherwise remove itself from intercepting I/O requests by regular applications). In certain implementations using a data structure to track whether regions of the clone virtual disk file have been written to, the data structure can be automatically deleted when the cloning operation is complete. In other implementations, the data structure may be committed to persistent memory, archived, or otherwise stored.

Accordingly, embodiments of the instant provisioning systems may implement various embodiments of the methods 400, 500, 600, and/or 700 to present an illusion to multiple applications accessing the cloned volume 164 that the cloned volume contains all the appropriate data, even while the cloned volume 164 is still being filled with data by the cloning application 236.

The foregoing examples and embodiments are intended to illustrate, but not to limit, various features of the inventions. Thus, various implementations of the instant provisioning systems and methods described herein may be readily adapted for a range of operations including, but not limited to, cloning, copying, moving, replicating, recovering, migrating, backing up, and restoring physical or virtual machines, virtual disk files, logical volumes, files or file systems, databases, and so forth.

V. Terminology

For purposes of illustration, certain aspects, advantages and novel features of various embodiments of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein. Further, no single feature, or group of features, is necessary or indispensable to every embodiment.

Depending on the embodiment, certain acts, events, or functions of any of the methods and algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. The storage medium may include a non-transitory computer-readable medium. The storage medium may store information persistently or otherwise and may include volatile or non-volatile storage. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for cloning a virtual disk file in a virtual computing environment, the method comprising:
    under control of a computer system comprising one or more physical computing devices:
    receiving a request to clone a source virtual disk file, the source virtual disk file comprising a source file system representing data stored in the source virtual disk file;
    instructing a cloning application to begin cloning of a clone virtual disk file from the source virtual disk file, the clone virtual disk file comprising a clone file system representing data stored or to be stored in the clone virtual disk file;

launching a virtual machine;

associating the clone virtual disk file with the virtual machine before the cloning of the clone virtual disk file is completed, the virtual machine having access to the entire clone file system of the clone virtual disk file before the cloning of the clone virtual disk file is completed;

receiving a read request from an application executing in the virtual machine for data represented in the clone file system of the clone virtual disk file;

determining whether the data has been written to the clone virtual disk file, wherein:

if the data has been written, retrieving the data from the clone virtual disk file; and if the data has not been written, retrieving the data from the source virtual disk file.

2. The method of claim 1, further comprising:

receiving a write request from the cloning application to write data to a region in the clone virtual disk file;

determining whether the region in the clone virtual disk file has been written, wherein:

if the region has been written, communicating to the cloning application that the write has been performed without performing the write request to the clone virtual disk file; and if the region has not been written, performing the write request to the clone virtual disk file;

receiving a write request from an application executing on the virtual machine or from a cache manager configured to cache input/output requests to the clone virtual disk file; and performing the write request from the application executing on the virtual machine or from the cache manager to the clone virtual disk file.

3. The method of claim 2, further comprising associating a data structure with the clone virtual disk file, the data structure configured to track whether regions of the clone virtual disk file have been written to.

4. The method of claim 3, wherein the data structure is not configured to track identity of an application that performed a write to a region of the clone virtual disk file.

5. The method of claim 3, wherein the data structure comprises a bitmap.

6. The method of claim 3, wherein determining whether the region on the clone virtual disk file has been written comprises accessing the data structure to determine whether the region on the clone virtual disk file has been written to.

7. The method of claim 3, further comprising updating the data structure after a region of the clone virtual disk file has been written to.

8. The method of claim 3, further comprising storing the data structure in a persistent memory.

9. The method of claim 2, further comprising using a cloning filter for determining whether the data has been written to the clone virtual disk file and determining whether the region on the clone virtual disk file has been written.

10. The method of claim 9, further comprising:

launching the cloning filter in a parent partition of a host computer; and launching the virtual machine in a child partition of the host computer.

11. The method of claim 10, wherein the cloning filter is configured to act as a file system filter driver in the parent partition and as a volume filter driver in the child partition.

12. The method of claim 9, further comprising, after completion of the cloning of the clone virtual disk file, terminating the cloning filter.

13. The method of claim 9, further comprising, after completion of the cloning of the clone virtual disk file, removing the cloning filter from input/output paths of applications executing on the virtual machine.

14. The method of claim 2, further comprising, if the write request from the application executing on the virtual machine or from the cache manager to the clone virtual disk file is successful, updating a data structure associated with the clone virtual disk file that is configured to track whether regions of the clone virtual disk file have been written to.

15. A system for cloning a virtual disk file in a virtual computing environment, the system comprising:

a host server comprising a virtualization layer configured to support a parent partition and a child partition, the parent partition comprising a virtual machine management system, the child partition comprising a virtual machine having a guest operating system and one or more applications that access resources of the host server via the virtualization layer;

a data store comprising at least a source virtual machine disk file and a clone virtual machine disk file, the clone virtual machine disk file associated with the virtual machine, the clone virtual machine disk file comprising one or more volumes accessible to the guest operating system; and a management module executed by or in network communication with the host server, the management module configured to:

instruct a cloning application to begin cloning the source virtual machine disk file to the clone virtual machine disk file, the cloning application configured to execute in the parent partition;

instantiate a cloning filter in the parent partition, the cloning filter configured to act as a file system filter driver in the parent partition and as a volume filter driver in the child partition; and wherein the cloning filter is further configured to, in response to a request from the cloning application to write data to a portion of the clone virtual machine disk file, prevent the cloning application from overwriting the portion of the clone virtual machine disk file if the portion has already been written.

16. The system of claim 15, wherein the cloning filter is further configured to:

in response to a request from the one or more applications for data in the one or more volumes of the clone virtual disk file, direct the request to the clone virtual disk file if the data has been written to the clone virtual disk file and direct the request to the source virtual disk file if the data has not been written to the clone virtual disk file.

17. The system of claim 16, wherein the request from the one or more applications for data in the one or more volumes of the clone virtual disk file is a non-cached read request.

18. The system of claim 16, wherein the cloning filter is associated with a data structure configured to track whether regions of the clone virtual disk file have been written to.

19. The system of claim 18, wherein the cloning filter is further configured to update the data structure upon successful completion of a write to the clone virtual machine disk.

20. The system of claim 18, wherein the management module is further configured to store the data structure in a persistent memory.

21. The system of claim 20, wherein the management module is further configured to:

read the data structure from the persistent memory; and
resume a previously terminated cloning operation.

22. The system of claim 16, wherein the management module is further configured to remove the cloning filter from input/output paths of the one or more applications after cloning of the clone virtual machine disk file is completed.

23. The system of claim 16, wherein at least one of the source virtual machine disk file and the clone virtual machine disk file comprises a Virtual Hard Disk (VHD) file.

24. A method for copying a source file to a target file in a virtual computing environment, the method comprising:
   under control of a host computer comprising a virtualization layer supporting a parent partition and a child partition, the child partition executing a virtual machine having a guest operating system and one or more applications that access resources of the host computer via the virtualization layer, the host computer in communication with a data store storing the source file and the target file:
   executing, in the parent partition, a copying application that copies the source file to the target file;
   executing, in the parent partition, a cloning filter configured to intercept write requests by the copying application and read requests by the one or more applications of the virtual machine;
   receiving, during the copying, a read request from the one or more applications for a portion of the target file, wherein in response to the read request, the method comprises:
      determining, by the cloning filter, whether the requested portion of the target file has been written;
      if the portion has been written to the target, retrieving the requested portion from the target file; and
      if the portion has not been written to the target file, retrieving the requested portion from the source file.

25. The method of claim 24, further comprising:
receiving, during the copying, a write request from the copying application to write to a portion of the target file, wherein in response to the write request, the method comprises:
   determining, by the cloning filter, whether the portion of the target file has been written;
   if the portion has been written, returning to the cloning operation an indication that the write request has been performed without actually performing the write; and
   if the portion has not been written to the target file, writing the portion to the target file.

26. The method of claim 25, further comprising:
providing a data structure indicative of whether portions of the target file have been written, the data structure accessible to the cloning filter.

27. The method of claim 26, further comprising updating the data structure after a portion of the target file has been written.

28. The method of claim 26, further comprising deleting the data structure after the copying of the source file is complete.

29. The method of claim 25, further comprising terminating or suspending the cloning filter after the copying of the source file is complete.

* * * * *